(12) United States Patent
Chang (10) Patent No.: US 8,164,733 B2
(45) Date of Patent: Apr. 24, 2012

(54) LIQUID CRYSTAL DISPLAY PANEL

(75) Inventor: Chung-Wei Chang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 825 days.

(21) Appl. No.: 12/255,640

(22) Filed: Oct. 21, 2008

(65) Prior Publication Data

US 2009/0244427 A1 Oct. 1, 2009

(30) Foreign Application Priority Data

Mar. 28, 2008 (TW) .............................. 97111524 A (51) Int. Cl.
*G02F 1/1333* (2006.01)

(52) U.S. Cl. ............... 349/192; 349/40; 349/54; 349/55

(58) Field of Classification Search .................... 349/40, 349/54–55, 192
See application file for complete search history.

(56) References Cited

U.S. PATENT DOCUMENTS

| | | | |
|---|---|---|---|
| 5,002,367 A | 3/1991 | Nicholas | |
| 5,909,035 A | 6/1999 | Kim | |
| 2003/0085404 A1 | 5/2003 | Kim | |
| 2007/0159571 A1 | 7/2007 | Yang | |
| 2007/0262967 A1 | 11/2007 | Rho | |
| 2008/0123013 A1* | 5/2008 | Kim | 349/54 |
| 2009/0033823 A1 | 2/2009 | Chung et al. | |

FOREIGN PATENT DOCUMENTS

| | | |
|---|---|---|
| CN | 101021633 A | 8/2007 |
| CN | 101122695 A | 2/2008 |
| JP | 2001125136 | 5/2001 |
| JP | 2002350860 | 12/2002 |
| TW | 200734732 | 9/2007 |
| TW | 200801749 | 1/2008 |

* cited by examiner

*Primary Examiner* — Phu Vu (74) *Attorney, Agent, or Firm* — Winston Hsu; Scott Margo (57) ABSTRACT

A liquid crystal display panel includes a first substrate, and a second substrate opposite to and facing the first substrate. The first substrate, having a repairing region and a display region defined thereon, includes at least one repairing wire arranged in the repairing region, and a passivation layer disposed over the repairing wire. The second substrate includes a common electrode, and at least one repairing protection pad formed thereon. The repairing protection pad, disposed on the surface of the common electrode and in the repairing region, faces the first substrate, and corresponds to the repairing wire.

8 Claims, 12 Drawing Sheets

FIG. 12

LIQUID CRYSTAL DISPLAY PANEL

BACKGROUND OF THE INVENTION

1. Field of the Invention

The present invention relates to a liquid crystal display panel and method of making the same, and more particularly, to a liquid crystal display panel incorporated with a repairing protection pad and a method of repairing a liquid crystal display panel able to increase repairing tolerance.

2. Description of the Prior Art

A liquid crystal display (LCD) panel is mainly composed of a thin film transistor substrate (TFT substrate), a color filter substrate (CF substrate), and liquid crystal molecules disposed between the TFT substrate and the CF substrate, where the TFT substrate includes pixel regions arranged in matrix, and components such as scan lines, data lines, TFTs, etc. As LCD devices have been prevailing, the requirement for high resolution LCD devices is increased as well. Also, on the demand of energy saving, the pixel aperture ratio is required to increase, and the line width is required to diminish. With the increase of wiring density, possibility of defect when forming scan lines, data lines or other conductive wiring patterns in the TFT substrate is accordingly increasing. Concerning associated costs, laser repairing process is a common way to repair the defect if repairable. However, the conventional laser repairing process can only be successfully achieved within a particular and narrow energy range. Excessive laser energy may lead to short-circuit due to the electrical connection between metal chippings and common electrode of the CF substrate; while insufficient laser energy cannot melt and electrically connect metals. This narrow repairing tolerance causes low yield of the laser repairing process.

SUMMARY OF THE INVENTION

It is therefore one of the objectives of the present invention to provide an LCD panel and method of making the same to improve the yield of laser repairing process.

According to the present invention, an LCD panel is provided. The LCD panel includes a first substrate, and a second substrate. The first substrate, having a repairing region defined thereon, includes a repairing wire and a passivation layer, wherein the repairing wire is disposed in the repairing region, and the passivation layer is disposed on the repairing wire. The second substrate is disposed opposite to and facing the first substrate. The second substrate includes a common electrode, and a repairing protection pad, wherein the common electrode is disposed on a side of the second substrate facing the first substrate, and the repairing protection pad is disposed on a side of the common electrode facing the first substrate. The repairing protection pad is disposed in the repairing region and corresponding to the repairing wire.

According to the present invention, a method for fabricating a liquid crystal display panel is provided. The method includes the following steps. First, a first substrate having a display region and a repairing region defined thereon is provided. Then, a repairing wire is formed in the repairing region of the first substrate, and a passivation layer is formed on the repairing wire. A second substrate is then provided, and a common electrode is formed on the second substrate. Subsequently, a photoresist pattern is formed on the common electrode, wherein the photoresist pattern comprises a photo spacer and a repairing protection pad. Following that, the second substrate is adhered to the first substrate, wherein the photo spacer is corresponding to the display region, and the repairing protection pad is corresponding to the repairing wire of the repairing region.

The repairing protection pad disposed in the repairing region is capable of enlarging the process tolerance of laser repairing process. Also, the repairing protection pad formed with the photo spacer by the same exposure and development process would not increase manufacturing cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
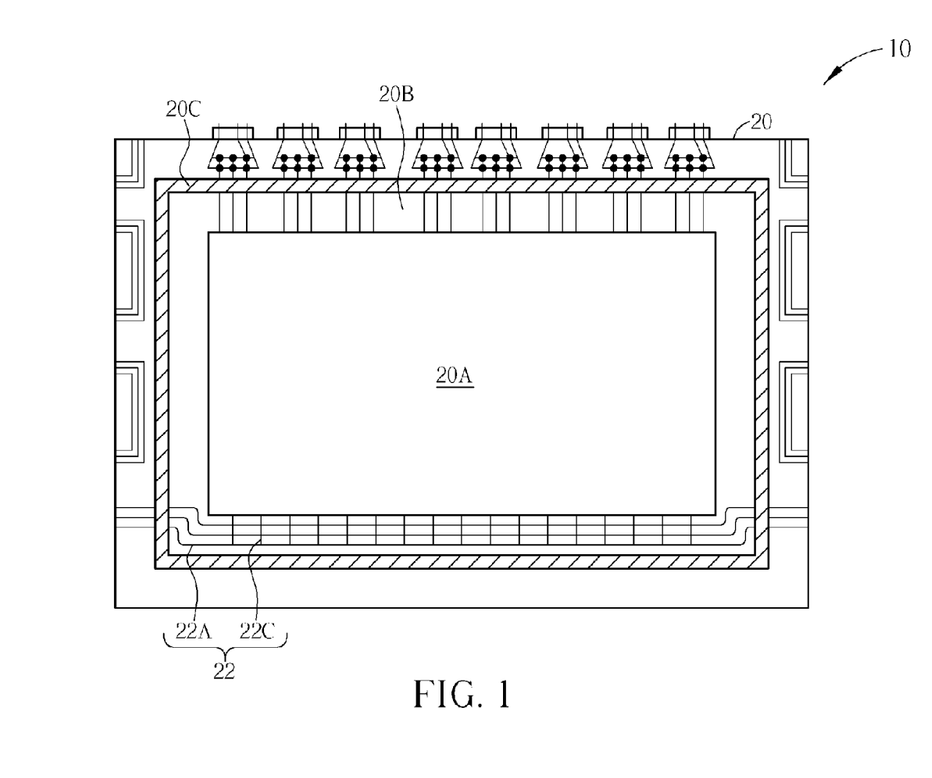
FIGS. 1-2 illustrate an LCD panel according to a preferred embodiment of the present invention.
Figure 2:
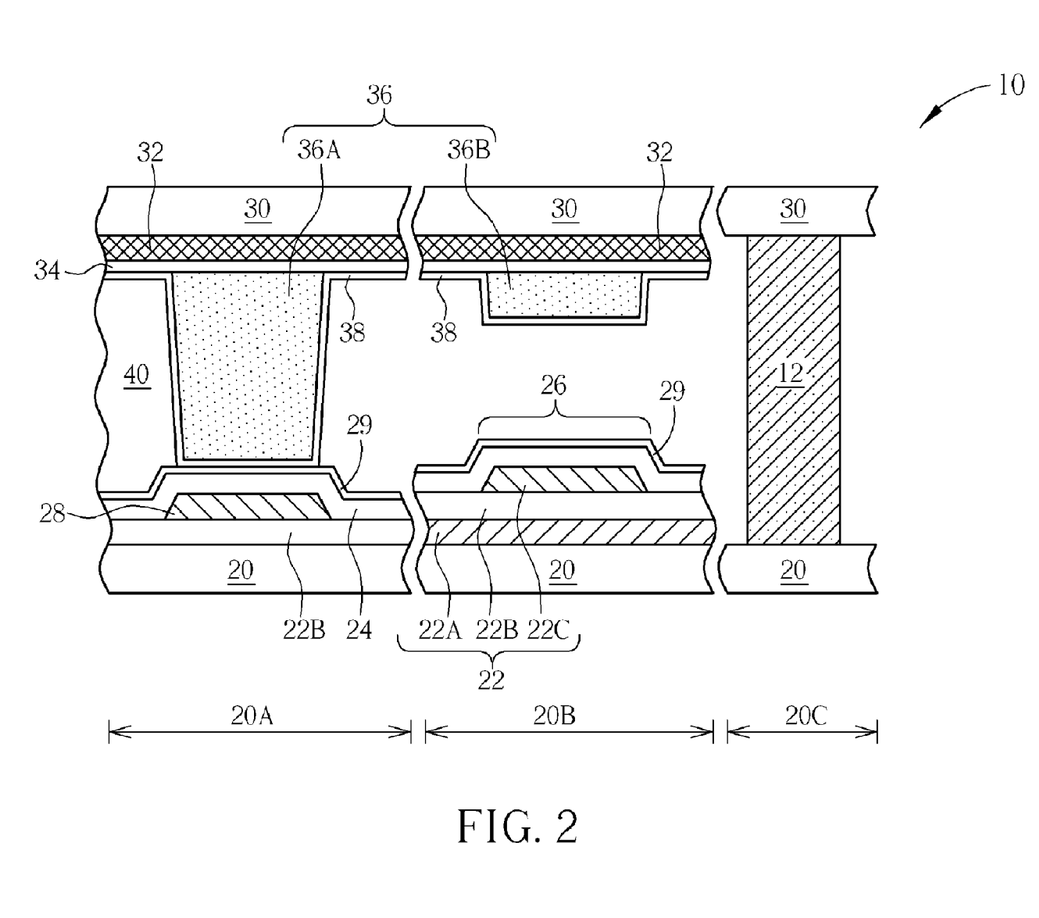

Please refer to FIGS. 1-2. FIGS. 1-2 illustrate an LCD panel according to a preferred embodiment of the present invention, where FIG. 1 is a top view and FIG. 2 is a cross-sectional view. In order to clearly demonstrate the feature of the present invention, some components are omitted in FIG. 1. As shown in FIGS. 1-2, the LCD panel 10 of the present embodiment includes a first substrate 20, a second substrate 30 disposed opposite to and facing the first substrate 20, and a liquid crystal layer 40 disposed between the first substrate 20 and the second substrate 30. The first substrate 20 may be a TFT substrate, and the second substrate 30 may be a CF substrate, but not limited. The first substrate 20 includes a display region 20A, a repairing region 20B, and a sealant region 20C, where the repairing region 20B is disposed between the display region 20A and the sealant region 20C, and a sealant 12 is disposed between the first substrate 20 and the second substrate 30 in the sealant region 20C.

The first substrate 20 includes a repairing wire 22 disposed in the repairing region 20B, and a passivation layer 24 disposed on the repairing wire 22. An alignment film 29 may be selectively disposed on the surface of the passivation layer 24. Take a repairing wire 22 for repairing a data line for example, the repairing wire 22 has a welding area 26, and the repairing wire 22 includes a first wire 22A, a second wire 22C, and an insulating layer 22B disposed between the first wire 22A and the second wire 22C. The first wire 22A of the repairing wire 22 may be part a first metal layer (Metal 1) disposed on the first substrate (TFT substrate) 20 of the LCD panel 10, and the second wire 22C may be part of a second metal layer (Metal 2). The second wire 22C may be directly electrically connected to a data line disposed in the display region 20A, or may be electrically connected to the data line by laser welding, but not limited. Based on different design requirements, the second wire 22C may also be part of the first metal layer, while the first wire 22A may be part of the second metal layer. In addition, the repairing wire (not shown) used to repairing a scan line may be electrically connected to the scan line disposed in the display region 20A through the first metal layer. In normal state, the first wire 22A and the second wire 22C are insulated by the insulating layer 22B, or part of the first wire 22A and part of the second wire 22C may be electrically connected. The data line, however, is isolated from the first wire 22A and the second wire 22C. When the conductive wire disposed on the first substrate 20 is detected to be qualified, the repairing wire 22 does not influence the operation of the LCD panel 10. Once one of the conductive wires is detected to be abnormal, the repairing wire 22 electrically connected to the abnormal conductive wire functions as a replacing wire, and the signal meant to deliver to the abnormal conductive wire will be electrically connected to the replacing wire by performing a laser repairing process.

The second substrate 30 includes a common electrode 34 and a photoresist pattern 36, and may selectively include a black matrix pattern 32. The black matrix pattern 32 is disposed on a side of the second substrate 30 facing the first substrate 20, the common electrode 34 is disposed on a side of the black matrix pattern 32 facing the first substrate 20, and the photoresist pattern 36 is disposed on a side of the common electrode 34 facing the first substrate 20. The photoresist pattern 36 includes a photo spacer 36A and a repairing protection pad 36B, wherein the photo spacer 36A is disposed in the display region 20A, and the repairing protection pad 36B is disposed in the repairing region 20B and corresponding to the repairing wire 22. An alignment film 38 may be selectively disposed on the surface of the common electrode 34 and the photoresist pattern 36. In addition, if the LCD panel 10 is designed to be composed of a color filter on array substrate and a counter substrate, the black matrix pattern and a color filter layer (not shown) are disposed on the color filter on array substrate while the common electrode and the photoresist pattern are disposed on the counter substrate.

The photo spacer 36A is used to support the first substrate 20 and the second substrate 30, so as to maintain a constant gap between the first substrate 20 and the second substrate 30. In order not to influence the aperture ratio, the photo spacer 36A is normally corresponding to a conductive wire 28 e.g. a data line or a scan line, or to the overlapping area of Metal 1 and Metal 2, but not limited. The repairing protection pad 36B is corresponding to the welding area 26 in the repairing region 20B. In the laser repairing process, the laser beam passes through the first substrate 20 (or consecutively passes through a polarizer (not shown) disposed on the outer surface of the first substrate 20 and the first substrate 20), and irradiates the repairing wire 22 so that the first wire 22A and the second wire 22C are melted and electrically connected together. The repairing protection pad 36B is used to isolated the metal chippings generated in the laser repairing process from electrically connected to the common electrode 34 of the second substrate 30 so that short circuit does not happen. The repairing protection pad 36B increases the repairing tolerance of the laser repairing process, and thus improves the yield of the repairing process.

As shown in FIG. 1, the repairing region 20B of the first substrate 20 includes at least one repairing wire 22 to repair abnormal conductive wire. In this embodiment, the repairing wire 22 is configured to repair the data line (not shown), and therefore the second wire 22C of the repairing wire 22 is electrically connected to the corresponding data line, or may be electrically connected to the data line after laser welding. The first wire 22A and the second wire 22C of the repairing wire 22 are arranged alternately but not electrically connected together, or the first wire 22A and the second wire 22C may be originally connected in part but disconnected by laser cutting. The amount of the first wire 22A decides the number of the conductive wires that can be repaired and the number of times of repairing that can be done. For instance, the repairing wire 22 includes three first wires 22A as shown in FIG. 1, and thus six or less than six abnormal data lines can be replaced by the first wires 22A. The number of the first wires 22A is not limited and may be modified based on different layout design or actual process yield.

In this embodiment, the height of the repairing protection pad 36B is smaller than the height of the photo spacer 36A. The height of the repairing protection pad 36B herein means the average height of the repairing protection pad 36B. In such a case, the photo spacer 36A can support the first substrate 20 and the second substrate 30, and maintain a certain gap between the first substrate 20 and the second substrate 30. The repairing protection pad 36B, which is thinner than the photo spacer 36A, does not affect the gap between the first substrate 20 and the second substrate 30 but can increase the process tolerance of the laser repairing process. In this embodiment, the height of the repairing protection pad 36B is preferably between 5% and 90% of the height of the photo spacer 36A, but not limited.

Figure 3:
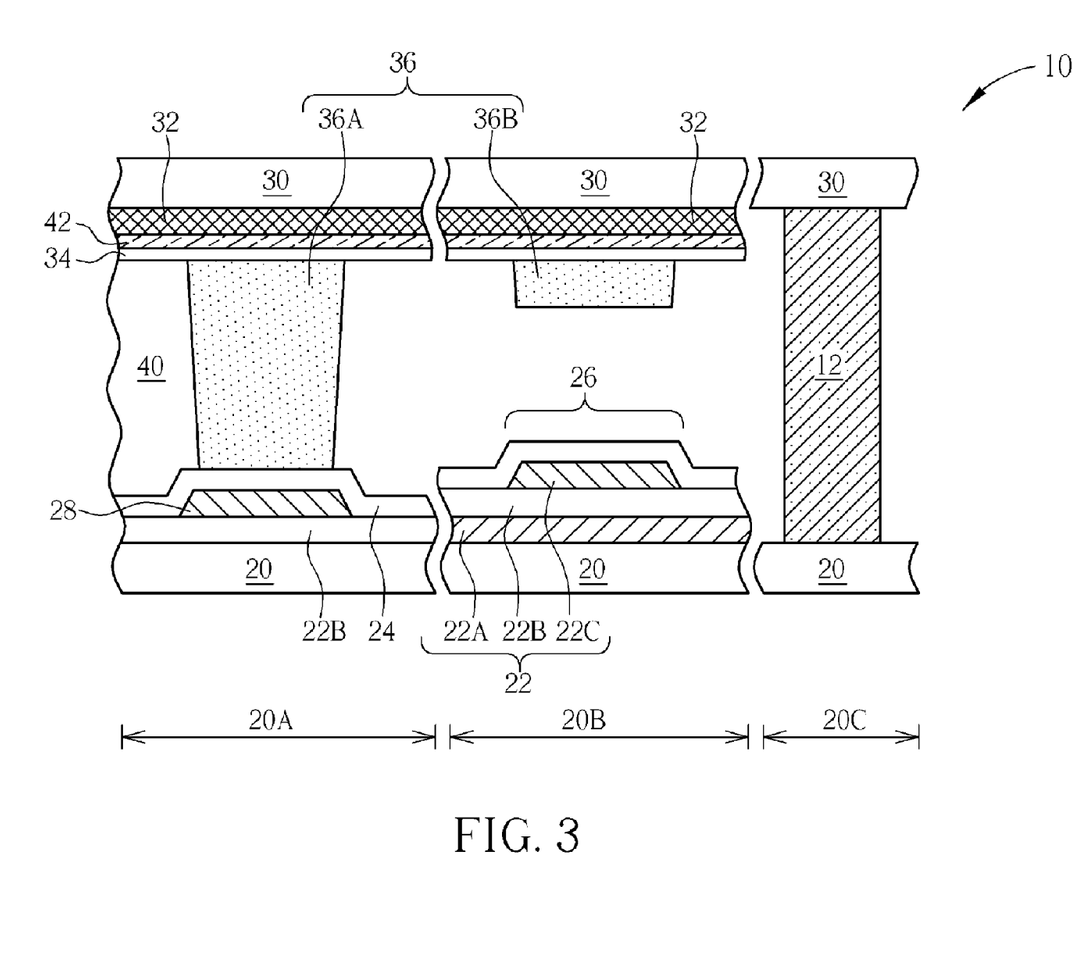
FIGS. 3-4 illustrate LCD panels according to two preferred embodiments of the present invention.
Figure 4:
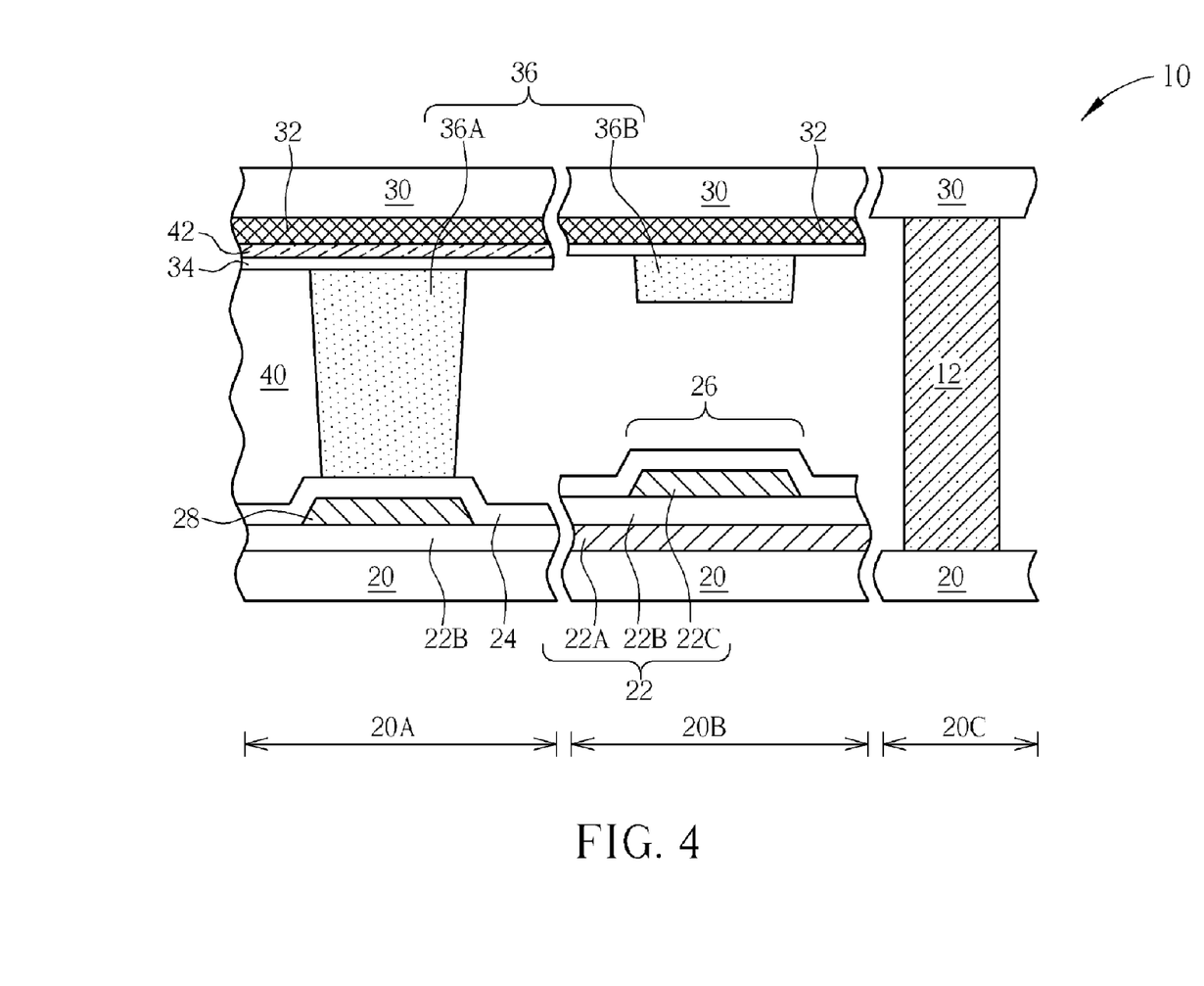

The LCD panel of the present invention is not limited to the aforementioned embodiment, and also includes the following embodiments. To emphasize the difference between different embodiments, the identical components are denoted by the identical numerals, and are not repeated redundantly. Please refer to FIGS. 3-4. FIGS. 3-4 illustrate LCD panels according to other preferred embodiments of the present invention. As shown in FIG. 3, the second substrate 30 includes a color filter layer 42 disposed between the black matrix pattern 32 and the common electrode 34 in the display region 20A and the repairing region 20B, where the color filter layer 42 may be entirely or partially disposed between the black matrix pattern 32 and the common electrode 34. As shown in FIG. 4, the second substrate 30 includes a color filter layer 42 disposed between the black matrix pattern 32 and the common electrode 34 only in the display region 20A, but not in the repairing region 20B.

Figure 5:
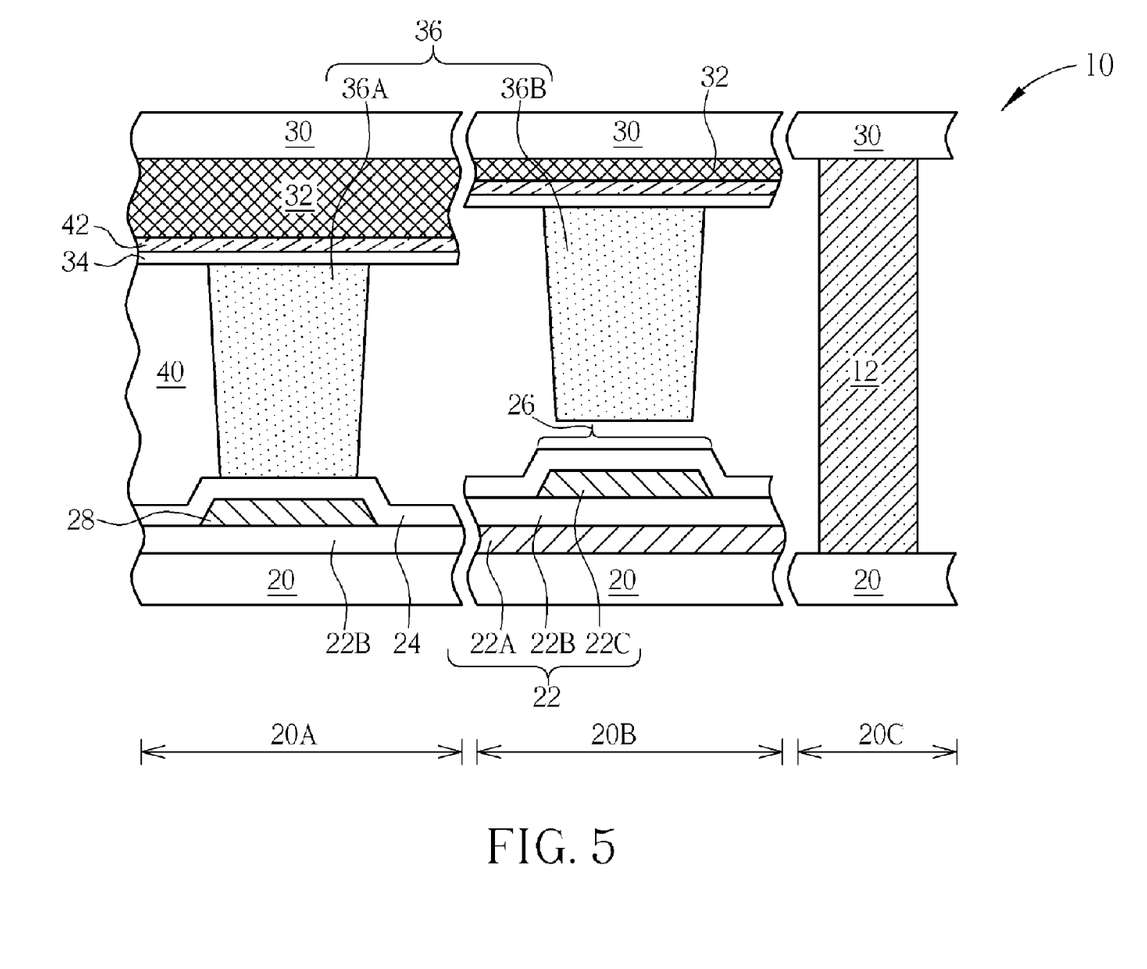
FIG. 5 illustrates an LCD panel according to still another embodiment of the present invention.

Please refer to FIG. 5. FIG. 5 illustrates an LCD panel according to still another embodiment of the present invention. As shown in FIG. 5, the thickness of the black matrix pattern 32 in the repairing region 20B is smaller than the thickness of the black matrix pattern 32B. Alternatively, the repairing region 20B may exclude the black matrix pattern 32, and the height of the repairing protection pad 36B and the photo spacer 36A can be substantially identical to simplify the mask pattern. Accordingly, by adjusting the thickness of the black matrix pattern 32, the repairing protection pad 36B may increase the repairing tolerance without influencing the gap between the first substrate 20 and the second substrate 30. In other alternative embodiments, the photo spacer 36A may also be disposed on the color filter layer 42, while the color filter layer 42 is removed from the repairing region 20B to form a height difference between the display region 20A and the repairing region 20B. In such a case, the height of the repairing protection pad 36B and the photo spacer 36A can be substantially identical to achieve the aforementioned effect.

The LCD panel 10 includes a repairing protection pad 36B disposed in the repairing region 20B corresponding to the repairing wire 22. In the repairing process, the laser beam used to melt the repairing wire 22 passes through the first substrate 20 and then irradiates the repairing wire 22. With the design of the repairing protection pad 36B, greater laser energy can be selected to welding the repairing wire 22. Even though metal chippings generate, the isolation provided by the repairing protection pad 36B can prevent the repairing wire 22 and the common electrode 34 of the second substrate 30 from short-circuiting. Accordingly, the process tolerance of the laser repairing is enlarged, so that the laser repairing process does not fail because of small deviation of laser energy.

Figure 6:
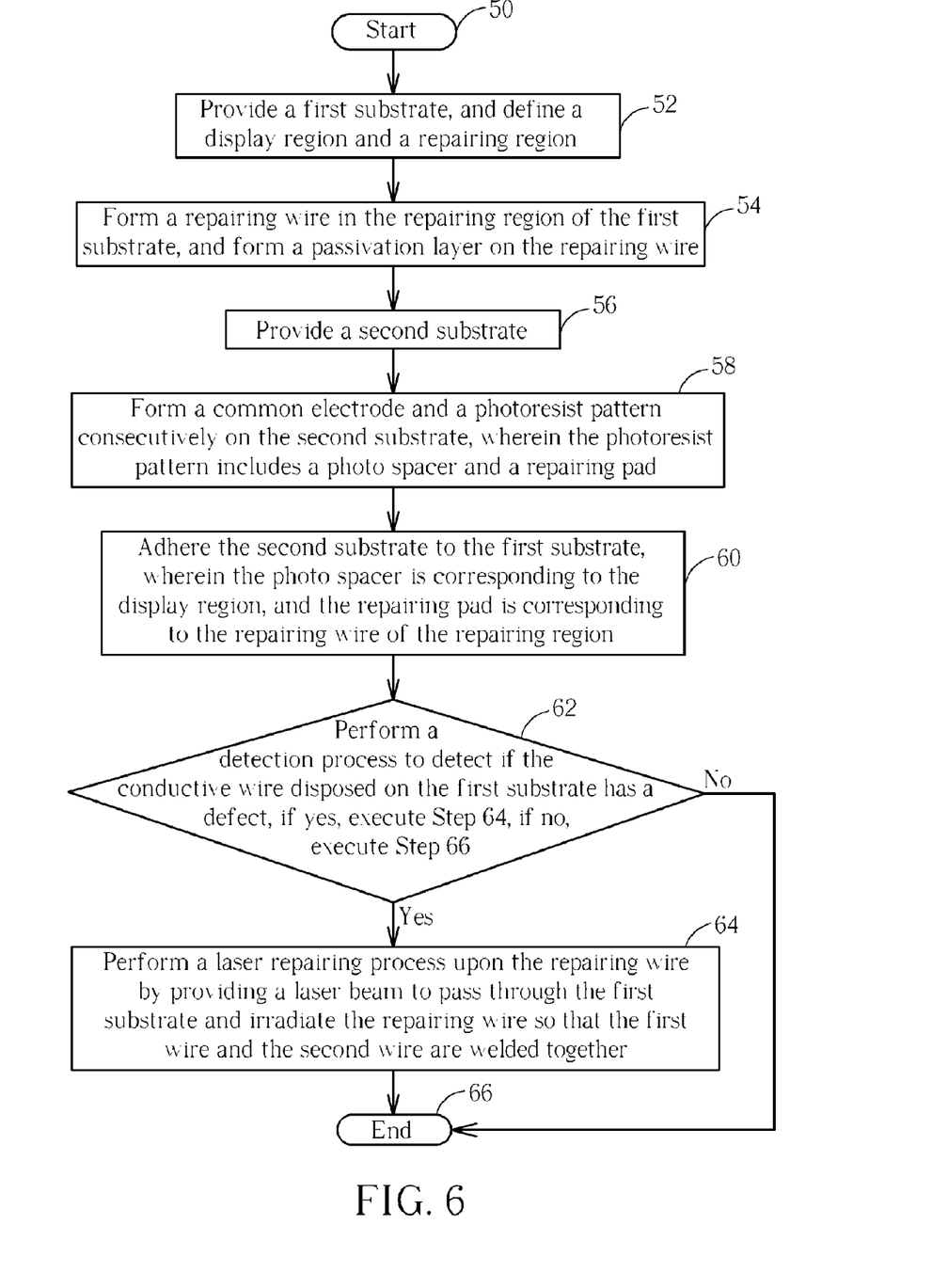
FIG. 6 illustrates a flow chart of a method of fabricating an LCD panel according to a preferred embodiment of the present invention.

Please refer to FIG. 6, in conjunction with FIGS. 1-5. FIG. 6 illustrates a flow chart of a method of fabricating an LCD panel according to a preferred embodiment of the present invention. As shown in FIG. 6, the method includes the following steps:

Step 50: Start;

Step 52: Provide a first substrate 20, and defining a display region 20A and a repairing region 20B;

Step 54: Form a repairing wire 22 in the repairing region 20B of the first substrate 20, and form a passivation layer 24 on the repairing wire 22;

Step 56: Provide a second substrate 30;

Step 58: Form a common electrode 34 and a photoresist pattern 36 consecutively on the second substrate 30, wherein the photoresist pattern 36 includes a photo spacer 36A and a repairing protection pad 36B, and a black matrix pattern 36 may be alternatively formed on the second substrate 30 prior to forming the common electrode 34;

Step 60: Adhere the second substrate 30 to the first substrate 20, wherein the photo spacer 36A is corresponding to the display region 20A, and the repairing protection pad 36B is corresponding to the repairing wire 22 of the repairing region 20B;

Step 62: Perform a detection process to detect if the conductive wire disposed on the first substrate 20 has a defect, if yes, execute Step 64, if no, execute Step 66;

Step 64: Perform a laser repairing process upon the repairing wire 22 by providing a laser beam to pass through the first substrate 20 and irradiate the repairing wire 22 so that the first wire 22A and the second wire 22C are welded together; and Step 66: End.

The photo spacer 36A and the repairing protection pad 36B are the same photoresist pattern 36, and are formed together by the same exposure and development process. The purpose of installing the repairing protection pad 36B is to increase the process tolerance of laser repairing process. In order not to influence the gap between the first substrate 20 and the second substrate 30, the repairing protection pad 36B disposed on the second substrate 30 should not be in contact with the first substrate 20 with too large area. This requirement may be fulfilled by adjusting the height of the repairing protection pad 36B, adjusting the thickness of the black matrix pattern 32, forming the color filter layer 42 corresponding to the photo spacer 36A in the display region 20A, or differentiating the thickness of the color filter layer 42 in different regions. The fabrication of the LCD panel of the present invention is described as follows.

Figure 7:
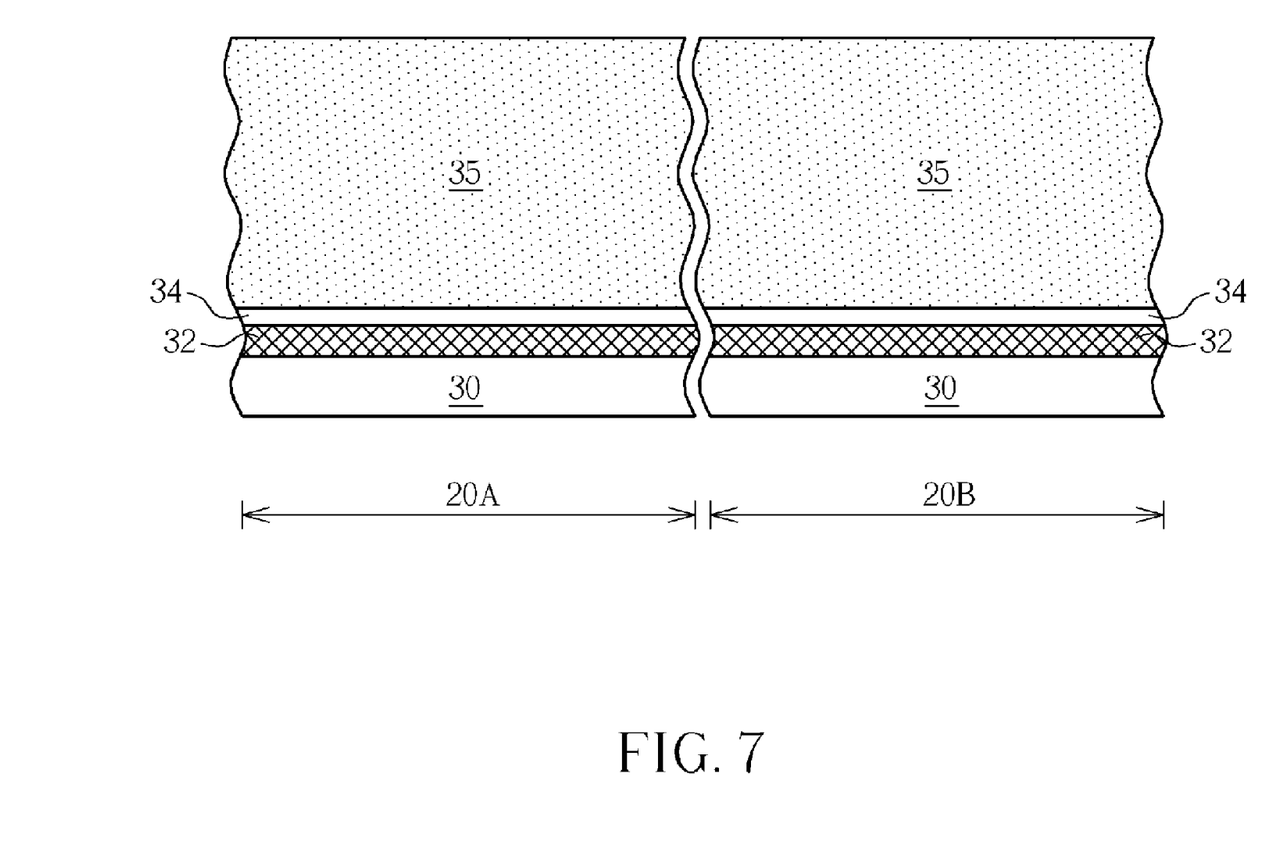
FIGS. 7-9 illustrate a method of fabricating an LCD panel according to a preferred embodiment of the present invention.
Figure 8:
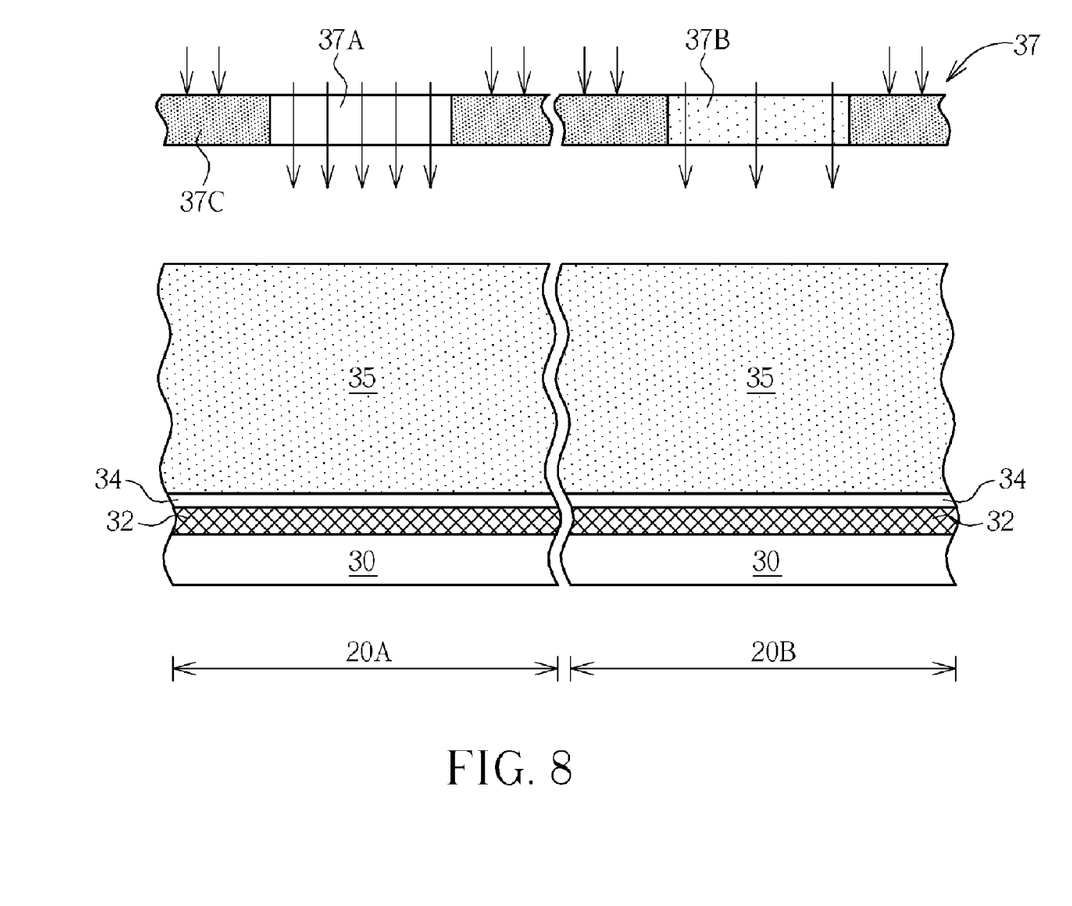
Figure 9:
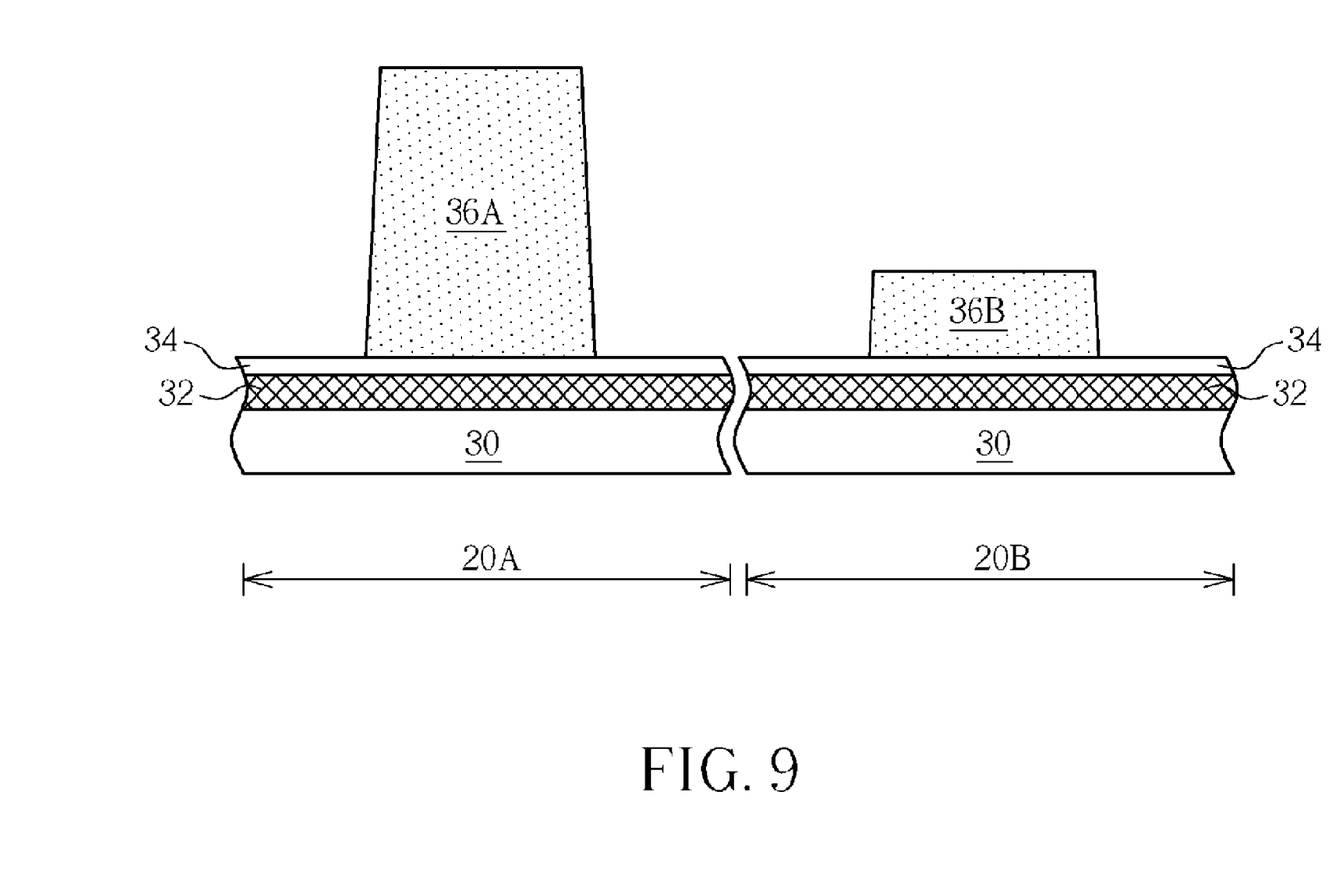

Please refer to FIGS. 7-9. FIGS. 7-9 illustrate a method of fabricating an LCD panel according to a preferred embodiment of the present invention. As shown in FIG. 7, a second substrate 30 is provided, and a common electrode 34 and a photoresist layer 35 are consecutively formed on the second substrate 30. Prior to forming the common electrode 34, a black matrix pattern 32 may be formed on the second substrate 30 in advance. As shown in FIG. 8, a graytone mask 37 such as a halftone mask, a phase shift mask, a fine slit graytone mask or a fine dot graytone mask is used to expose the photoresist layer 35. The graytone mask 37 includes a transparent region 37A, a translucent region 37B, and an opaque region 37C. The transparent region 37A is corresponding to locations where the photo spacer is to be formed in the display region 20A, the translucent region 37B is corresponding to locations where the repairing protection pad is to be formed in the repairing region 20B, and the opaque region 37C is corresponding to other locations. Subsequently, a development process is carried out to forming the photo spacer 36A, and the repairing protection pad 36B thinner than the photo spacer 36A as shown in FIG. 9.

Figure 10:
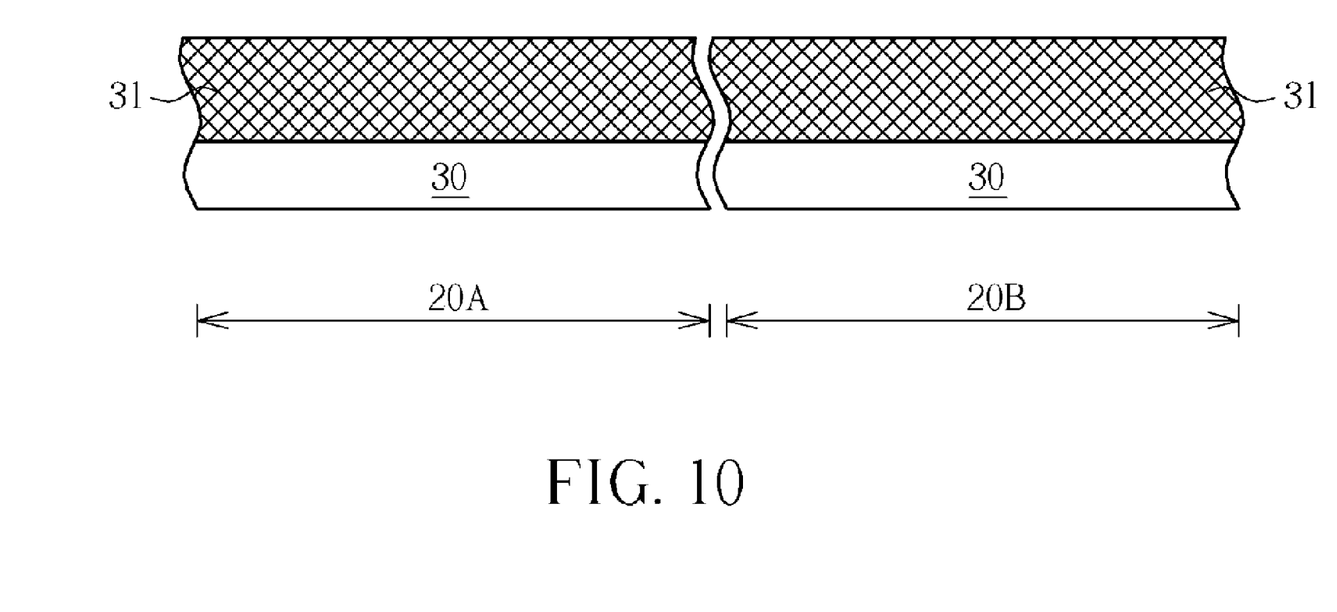
FIGS. 10-12 illustrate a method of fabricating an LCD panel according to another preferred embodiment of the present invention.
Figure 11:
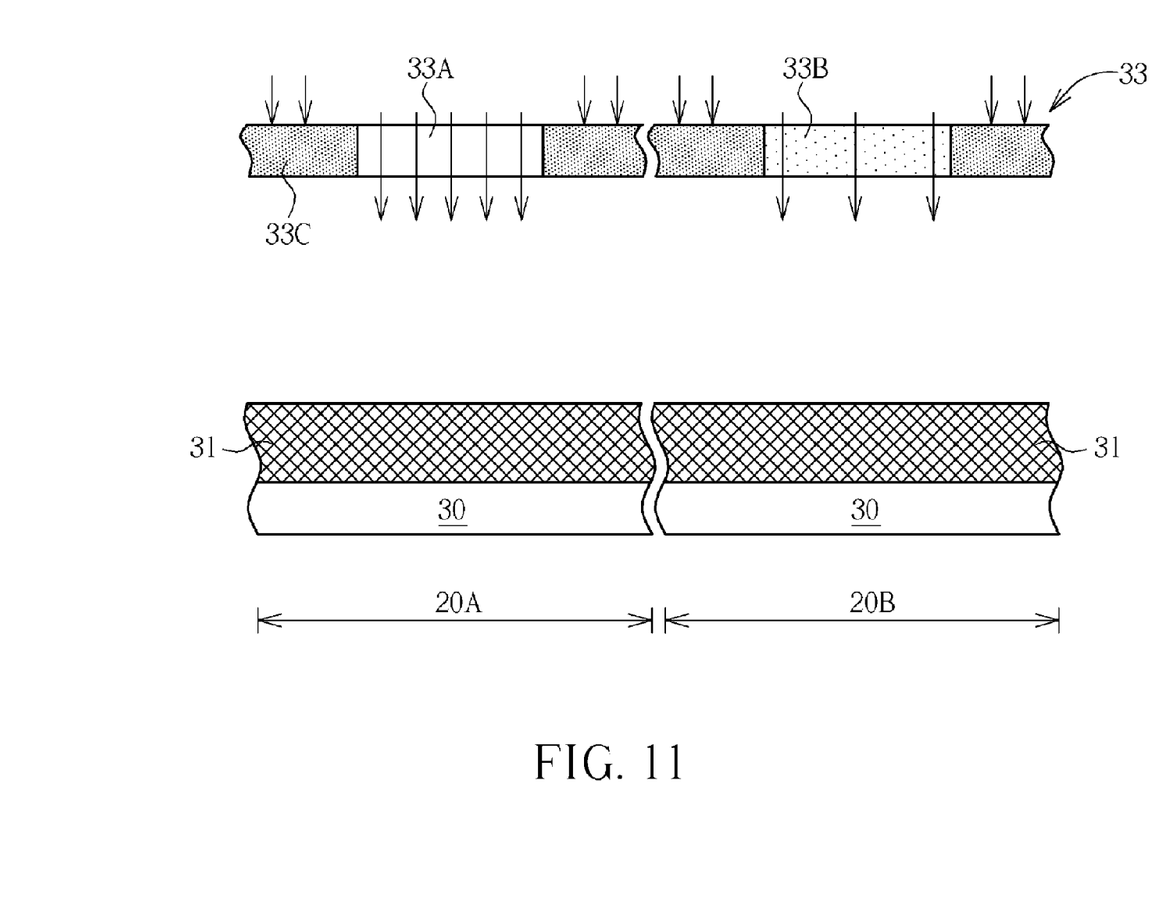
Figure 12:
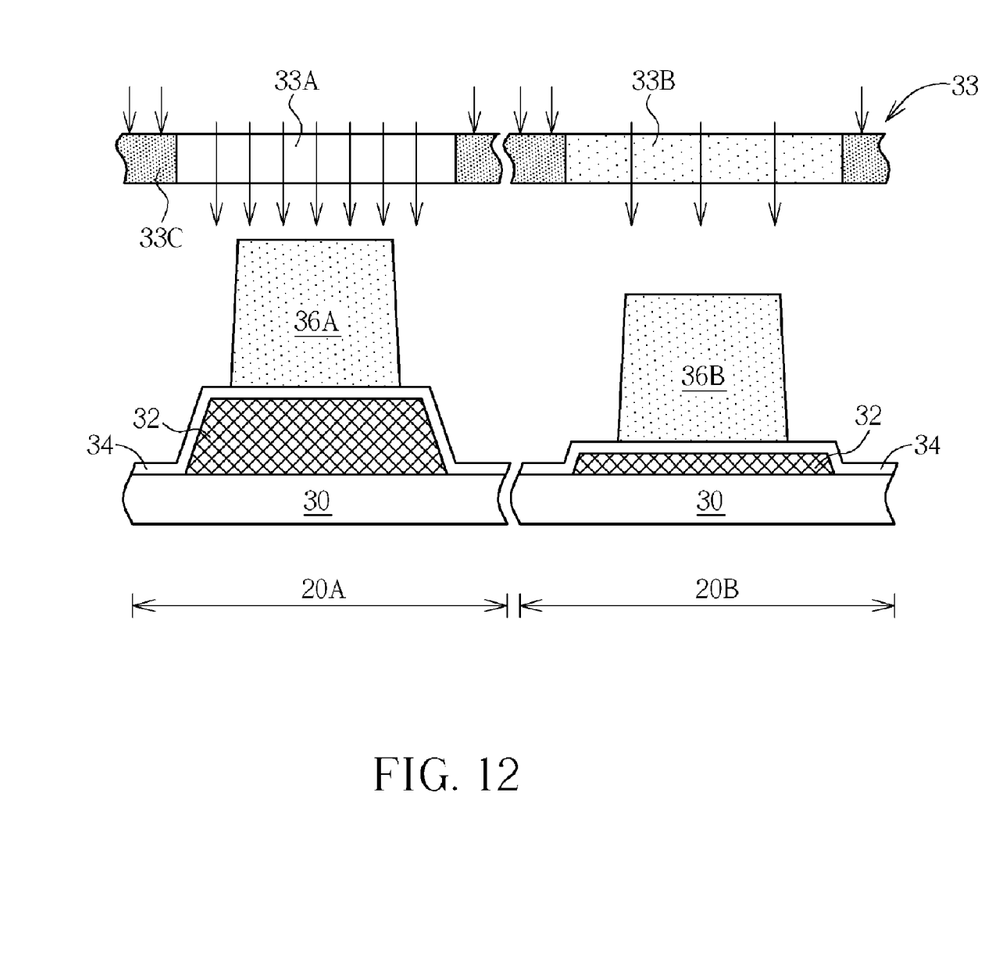

Please refer to FIGS. 10-12. FIGS. 10-12 illustrate a method of fabricating an LCD panel according to another preferred embodiment of the present invention. As shown in FIG. 10, a second substrate 30 is provided, and a black photoresist layer 31 is formed on the second substrate 30. As shown in FIG. 11, an exposure process is performed upon the black photoresist layer 31 with a graytone mask 33. The graytone mask 33 includes a transparent region 33A, a translucent region 33B, and an opaque region 33C. In this embodiment, the black photoresist layer 31 is negative type photoresist. Therefore, the transparent region 33A is corresponding to locations where the photo spacer is to be formed in the display region 20A, the translucent region 33B is corresponding to locations where the repairing protection pad is to be formed in the repairing region 20B, and the opaque region 33C is corresponding to other locations where the black photoresist layer 31 to be removed. The black photoresist layer 31 may also be positive type photoresist. In such a case, the opaque region 33C is corresponding to locations where the photo spacer is to be formed in the display region 20A, the translucent region 33B is corresponding to locations where the repairing protection pad is to be formed in the repairing region 20B, and the transparent region 33A is corresponding to other locations where the black photoresist layer 31 to be removed. As shown in FIG. 12, a development process is performed to form a black matrix pattern 32, where the thickness of the black matrix pattern 32 in the repairing region 20B is smaller than the thickness of the black matrix pattern 32 in the display region 20A due to the differences of exposure. Subsequently, a common electrode 34 is formed on the black matrix pattern 32, and a photo spacer 36A and a repairing protection pad 36B having the same height are formed on the common electrode 34. By differentiating the thickness of the black matrix pattern 32, the repairing protection pad 36B is able to increase the tolerance of laser repairing process without influencing the gap between the first substrate 20 and the second substrate 30.

In conclusion, the repairing protection pad disposed in the repairing region is capable of enlarging the process tolerance of laser repairing process. Also, the repairing protection pad formed with the photo spacer by the same exposure and development process would not increase manufacturing cost.

Those skilled in the art will readily observe that numerous modifications and alterations of the device and method may be made while retaining the teachings of the invention.

What is claimed is:

1. A liquid crystal display panel, comprising:
    a first substrate having a repairing region and a display region defined thereon, the first substrate comprising:
        a repairing wire disposed in the repairing region;
        a passivation layer disposed on the repairing wire; and
    a second substrate disposed opposite to and facing the first substrate, the second substrate comprising:
        a common electrode disposed on a side of the second substrate facing the first substrate; and
        a photoresist pattern disposed on the common electrode facing the first substrate, the photoresist pattern comprising a repairing protection pad and a photo spacer, wherein the repairing protection pad is disposed in the repairing region and corresponding to the repairing wire, and the photo spacer is disposed in the display region to maintain a gap between the first substrate and the second substrate.

2. The liquid crystal display panel of claim 1, wherein the first substrate comprises a thin film transistor substrate, and the second substrate comprises a color filter substrate.

3. The liquid crystal display panel of claim 1, wherein an average height of the repairing protection pad is smaller than a height of the photo spacer.

4. The liquid crystal display panel of claim 3, wherein the average height of the repairing protection pad is substantially between 5% to 90% of the height of the photo spacer.

5. The liquid crystal display panel of claim 1, further comprising a black matrix pattern disposed between the second substrate and the common electrode.

6. The liquid crystal display panel of claim 5, wherein a thickness of the black matrix pattern disposed in the repairing region is smaller than a thickness of the black matrix pattern in the display region.

7. The liquid crystal display panel of claim 1, further comprising a sealant region, wherein the repairing region is disposed between the display region and the sealant region.

8. The liquid crystal display panel of claim 1, wherein the repairing wire has a welding area, and the repairing wire comprises a first wire, a second wire, and an insulating layer disposed between the first wire and the second wire in the welding area.

* * * * *